US012801145B2

(12) United States Patent
Luo et al.

(10) Patent No.: US 12,801,145 B2
(45) Date of Patent: Nov. 17, 2026

(54) CONTROL METHOD, ELECTRONIC DEVICE, AND STORAGE MEDIUM

(71) Applicant: Lenovo (Beijing) Limited, Beijing (CN)

(72) Inventors: Yingling Luo, Beijing (CN); Meizi Lin, Beijing (CN); Chengyan Tan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 338 days.

(21) Appl. No.: 18/427,287

(22) Filed: Jan. 30, 2024

(65) Prior Publication Data

US 2024/0255953 A1 Aug. 1, 2024

(30) Foreign Application Priority Data

Jan. 31, 2023 (CN) ......................... 202310104502.8

(51) Int. Cl.
*G05D 1/224* (2024.01)
*G05D 1/229* (2024.01)

(52) U.S. Cl.
CPC ......... *G05D 1/2245* (2024.01); *G05D 1/2297* (2024.01)

(58) Field of Classification Search
CPC . G05D 1/2245; G05D 2109/12; G06T 19/006
See application file for complete search history.

(56) References Cited

U.S. PATENT DOCUMENTS

| | | | | |
|---|---|---|---|---|
| 11,762,369 | B2 * | 9/2023 | Edwards | B25J 9/1671 700/3 |
| 2020/0193150 | A1 * | 6/2020 | Shreve | G06V 20/52 |
| 2020/0249654 | A1 * | 8/2020 | Edwards | B25J 9/1671 |
| 2023/0345196 | A1 * | 10/2023 | Ma | H04S 7/304 |
| 2023/0368461 | A1 * | 11/2023 | Tian | G06T 17/00 |
| 2023/0418302 | A1 * | 12/2023 | Seifert | G05D 1/0038 |

* cited by examiner

*Primary Examiner* — Peter D Nolan
(74) *Attorney, Agent, or Firm* — ANOVA LAW GROUP, PLLC

(57) ABSTRACT

A control method includes controlling a virtual object to perform an action, the virtual object being constructed based on a physical object; determining a target instruction based on the action performed by the virtual object; and sending the target instruction to the physical object to cause the physical object to perform an action.

19 Claims, 8 Drawing Sheets

CONTROL METHOD, ELECTRONIC DEVICE, AND STORAGE MEDIUM

CROSS-REFERENCE TO RELATED APPLICATION

This application claims priority to Chinese Patent Application No. 202310104502.8, filed on Jan. 31, 2023, the content of which is incorporated herein by reference in its entirety.

TECHNICAL FIELD

The present disclosure generally relates to the field of robotic technology and, more particularly, to a control method and device.

BACKGROUND

Currently, when controlling a robot, there may be erroneous operations or redundant operations, resulting in low accuracy of robot movements.

SUMMARY

In accordance with the present disclosure, there is provided a control method. The method includes controlling a virtual object to perform an action, the virtual object being constructed based on a physical object; determining a target instruction based on the action performed by the virtual object; and sending the target instruction to the physical object to cause the physical object to perform an action.

Also in accordance with the present disclosure, there is provided an electronic device. The electronic device includes a memory, configured to store a computer program and data generated by execution of the computer program; and one or more processors, configured, when the computer program being executed, to: control a virtual object to perform an action, where the virtual object is constructed based on a physical object; determine a target instruction based on the action of the virtual object; and send the target instruction to the physical object, to cause the physical object to perform an action.

Also in accordance with the present disclosure, there is provided a non-transitory computer readable storage medium containing a computer program, that when being executed, causes one or more processors to perform a control method. The method includes controlling a virtual object to perform an action, the virtual object being constructed based on a physical object; determining a target instruction based on the action performed by the virtual object; and sending the target instruction to the physical object to cause the physical object to perform an action.

BRIEF DESCRIPTION OF THE DRAWINGS

In order to more clearly illustrate the technical solutions of the embodiments of the present disclosure, the drawings consistent with the description of the embodiments will be briefly described hereinafter. Apparently, the drawings in the following description are merely some embodiments of the present disclosure. Those of ordinary skill in the art may also obtain other drawings based on these drawings without exerting creative efforts.

DETAILED DESCRIPTION

The technical solutions in the embodiments of the present disclosure will be clearly and thoroughly described hereinafter with reference to the accompanying drawings. Apparently, the described embodiments are merely some but not all of the embodiments of the present disclosure. Based on the embodiments in the present disclosure, other embodiments derived by those of ordinary skill in the art without creative efforts fall within the scope of protection of the present disclosure.

Figure 1:
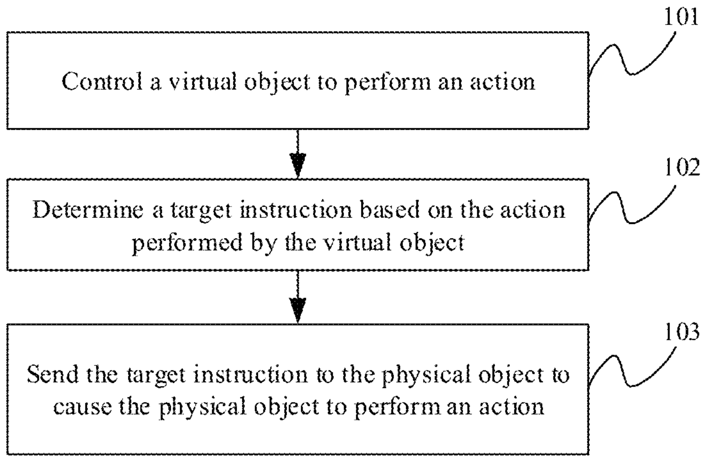
FIG. 1 is a flow chart of a control method, according to an embodiment of the present disclosure.

FIG. 1 illustrates a flow chart of a control method, according to Embodiment 1 of the present disclosure. The method may be applied to an electronic device capable of controlling actions of a physical object. The electronic device may be a device (e.g., a mobile phone, computer, server, etc.) that is independent of physical objects and capable of data transmission with the physical objects. The technical solutions in the disclosed embodiments are mainly used to improve the accuracy of motion control of physical objects.

In the disclosed embodiment, the method may include the following steps:

Step 101: Control a virtual object to perform an action.

A virtual object disclosed herein is built based on a physical object. A physical object is an object that can perform actions, such as a physical robot, a physical car, a physical spacecraft, etc. A virtual object (e.g., a virtual robot, a virtual car, a virtual spacecraft, etc.) is an object built based on a physical object.

In the disclosed embodiment, a virtual object may be controlled to perform a corresponding action in response to a first instruction. The first instruction is an instruction generated based on a received control action.

Taking the virtual object as a virtual robot as an example, a user operates the control stick of a physical robot to move forward, backward, left, or right. Accordingly, in the disclosed embodiment, a first instruction is generated based on the control action conducted on the control stick. The virtual robot is then controlled to move forward, backward, left, or right according to the first instruction.

Taking the virtual object as a virtual spacecraft as another example, a user operates a motion control in the control interface of the physical spacecraft. Accordingly, in the disclosed embodiment, a first instruction is generated based on the control action conducted on the motion control. The virtual spacecraft is then controlled to move according to the first instruction.

In some embodiments, controlling the virtual object to perform an action in Step 101 may further include: controlling at least one virtual sub-object in the virtual object to perform a corresponding action.

A virtual sub-object disclosed herein corresponds to a physical component included in a physical object. For example, a physical object may include one or more physical components. A virtual object built based on the physical object contains virtual sub-objects corresponding to each of the included physical components. Accordingly, in the disclosed embodiment, when controlling the virtual object to perform an action, a virtual sub-object corresponding to a physical component in the virtual object may be controlled to perform the corresponding action.

Taking the virtual object as a virtual robot as an example, a user operates the control stick of a mechanical arm of a physical robot to move to the left, and operates the control stick of a mechanical leg of the physical robot to move forward. Accordingly, in the disclosed embodiment, first instructions are respectively generated for the control actions conducted on the mechanical arm control stick and the mechanical leg control stick. The generated first instructions then control a mechanical arm of the virtual robot to move to the left according to the first instruction corresponding to the mechanical arm, and control a mechanical leg of the virtual robot to move forward according to the first instruction corresponding to the mechanical leg.

Step 102: Determine a target instruction based on the action of the virtual object.

In the disclosed embodiment, the action of the virtual object may be analyzed. Accordingly, based on the analysis result, a target instruction may be determined, where the target instruction is related to the action performed by the virtual object.

Step 103: Send the target instruction to the physical object, to cause the physical object to perform an action.

Figure 2:
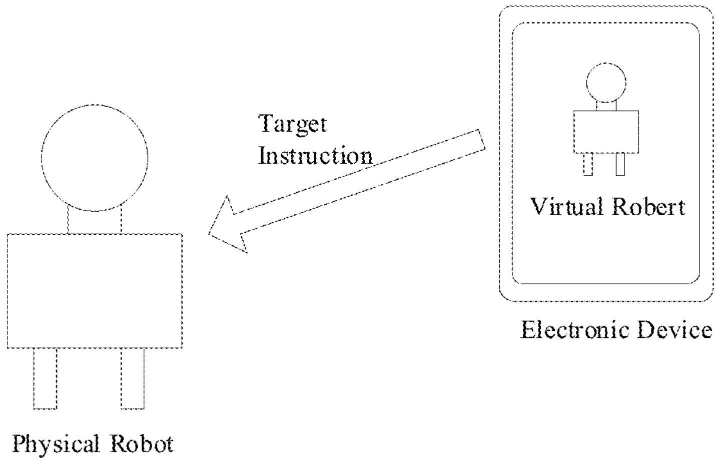
FIG. 2 is a schematic diagram of controlling a physical robot through a virtual robot, according to an embodiment of the present disclosure.

Taking the physical object as a physical robot as an example, as shown in FIG. 2, the electronic device consistent with the disclosed embodiment is a mobile phone independent of the physical robot, and a user conducts a touch operation on the mobile phone to control a motion control in the control interface of the physical robot. Accordingly, in the disclosed embodiment, a first instruction is generated based on the control action conducted on the motion control. The first instruction then controls the virtual robot to move according to the first instruction. Next, according to the action performed by the virtual robot, a target instruction is determined. The target instruction is then sent to the physical robot, to cause the physical robot to perform an action according to the target instruction.

From the above technical solutions, it can be seen that, in the control method disclosed in Embodiment 1 of the present disclosure, the virtual object corresponding to the physical object is pre-constructed. Based on that, the virtual object is first controlled to perform an action. A corresponding target instruction is then determined based on the action performed by the virtual object. The target instruction is then sent to the physical object to cause the physical object to perform the corresponding action. It can be seen that in the disclosed embodiment, the virtual object is constructed to pre-execute the action, and then the action of the physical object is controlled based on the pre-executed action of the virtual object, so that the action performed by the physical object is more accurate.

According to one embodiment, when determining the target instruction based on the action of the virtual object in Step 102, the following process may be performed:

Determine whether the action of the virtual object satisfies a control standard. When the action of the virtual object satisfies the control standard, the first instruction is determined to be the target instruction. For example, the first instruction may be an instruction to which the virtual object responds.

Here, the control standard is a standard of receiving a confirmation for the action performed by the virtual object. The confirmation is an action received through the operation interface and performed by a user to confirm the action of the virtual object.

In other words, in the disclosed embodiment, after controlling the virtual object to perform an action, if confirmation is received from the user to confirm the action performed by the virtual object, it may be then determined that the action of the virtual object satisfies the control standard. At this moment, it may be determined that the virtual object's action is an action that satisfies the user's requirements. At this point, the first instruction, being an instruction to which the virtual object responds (i.e., the first instruction that causes the action performed by the virtual object to satisfy the control standard), may be determined to be the target instruction. Accordingly, after the target instruction is sent to the physical object, the physical object may be caused to perform the corresponding action, and the action performed by the physical object may also satisfy the user's requirements.

Taking the physical object as a physical robot as an example, the electronic device consistent with the disclosed embodiment is a mobile phone that is independent of the physical robot. A user conducts a touch operation on a motion control in the control interface of the physical robot on the mobile phone. In the disclosed embodiment, a first instruction is generated based on the control action conducted on the motion control, and the virtual robot is controlled to move according to the first instruction. If a confirmation is received from the user to confirm the action of the virtual robot, then the first instruction is determined to be the target instruction, which is then sent to the physical robot, to cause the physical robot to perform the corresponding action according to the first instruction. In this way, the actual action performed by the physical robot may satisfy the user's requirements.

According to another embodiment, when determining the target instruction based on the action of the virtual object in Step 102, the following process may be performed:

When the action of the virtual object satisfies a control standard, a second instruction obtained based on the action of the virtual object is determined to be the target instruction.

Here, the second instruction is different from the first instruction, and the second instruction is an instruction generated according to the action actually performed by the virtual object.

In one situation, the actual action performed by the virtual object is completely consistent with the action indicated by the first instruction. For example, the virtual object does not encounter obstacles when moving following the first instruction and consistently moves. At this moment, the actual action performed by the virtual object is consistent with the continuous movement action indicated by the first instruction.

In another situation, the actual action performed by the virtual object is not completely consistent with the action indicated by the first instruction. For example, the virtual object encounters an obstacle during the movement following the first instruction and stops moving forward. At this moment, the actual action performed by the virtual object is an action of moving to the obstacle, which is inconsistent with the action of continuous movement indicated by the first instruction.

Accordingly, in the disclosed embodiment, after controlling the virtual object to perform an action, if confirmation is received from the user to confirm the action actually performed by the virtual object, it may be determined that the actual action performed by the virtual object satisfies a control standard. At this moment, the actual action performed by the virtual object may be determined to be an action satisfying the user's requirements, a second instruction may be then determined based on the actual action performed by the virtual object, where the second instruction may be determined to be the target instruction. Accordingly, after the target instruction is sent to the physical object, the physical object may be caused to perform the corresponding action, and the action actually performed by the physical object also satisfies the user's requirements.

Taking the physical object as a physical robot as an example, the electronic device consistent with the disclosed embodiment is a mobile phone that is independent of the physical robot. A user conducts a touch operation on a motion control in the control interface of the physical robot on the mobile phone. Accordingly, in the disclosed embodiment, a first instruction is generated based on the control action conducted on the motion control, and the virtual robot is controlled to move according to the first instruction. If a confirmation is received from the user to confirm the actual action of the virtual robot, then a second instruction is generated according to the actual action performed by the virtual robot. The second instruction is determined to be the target instruction and sent to the physical robot, to cause the physical robot to perform the corresponding action according to the second instruction. The action actually performed by the physical object may also satisfy the user's requirements.

Figure 3:
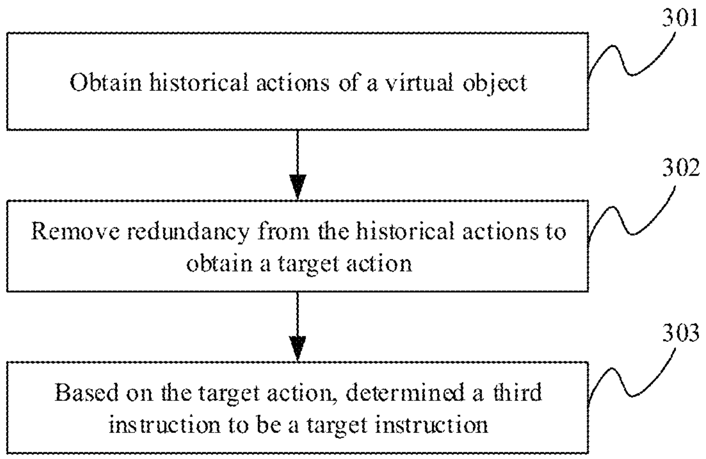
FIG. 3 is a flow chart of a part of a control method, according to an embodiment of the present disclosure.

According to yet another embodiment, when determining the target instruction based on the action of the virtual object in Step 102, the following steps may be performed, as shown in FIG. 3:

Step 301: Obtain historical actions of the virtual object.

Here, the historical actions of the virtual object are actions that the virtual object has completed, such as first moving forward 10 meters, then moving back 4 meters, etc.

Step 302: Remove redundancy in the historical actions to obtain a target action.

In the disclosed embodiment, removing redundancy in the historical actions performed by the virtual object may include: removing redundancy in an action path of the virtual object. For example, the overlapping parts in a round-trip action path are deleted, and so on. In this way, an effective action performed by the virtual object may be obtained, which is determined to be the target action.

Step 303: Based on the target action, determine a third instruction to be the target instruction.

Here, the third instruction corresponds to a part of the historical actions performed by the virtual object, that is, the effective action. Accordingly, after the third instruction is generated according to the target action of the virtual object, the third instruction is sent to the physical object as the target instruction, to cause the physical object to perform the corresponding action. This may prevent the physical object from executing ineffective actions, thereby reducing the power consumption of the physical object and improving the control efficiency.

For example, after a virtual robot's mechanical arm moves 10 centimeters to the left and then 5 centimeters to the right under the control of the control stick, the effective action of the virtual robot's mechanical arm is a movement of 5 centimeters to the left. Accordingly, a third instruction is generated according to the effective action of the mechanical arm's moving 5 centimeters to the left. The third instruction is determined to be the target instruction and sent to the physical robot, so that the mechanical arm of the physical robot moves 5 centimeters to the left. This prevents the mechanical arm from performing ineffective actions, thereby reducing the power consumption of the physical robot and improving the control efficiency.

For another example, after a virtual robot's wheel structure moves forward 10 meters, the wheel structure moves back 2 meters. Then the effective action of the virtual robot's wheel structure is a forward movement of 8 meters. Accordingly, according to the effective action of the wheel structure (i.e., moving forward 8 meters), a third instruction is generated. The third instruction is determined to be the target instruction and sent to the physical robot, to cause the wheel structure of the physical robot to move forward 8 meters. This prevents the wheel structure from executing ineffective actions, thereby reducing the power consumption of the physical robot and improving control efficiency.

Based on the above embodiments, in the present disclosure, the action control of the physical object may be delayed for a certain period of time relative to the action control conducted on the virtual object.

In the disclosed embodiment, after Step 101, timing starts when the virtual object begins to perform the action. When the timing reaches a duration threshold, Step 301 is executed. Accordingly, in the disclosed embodiment, compared to the virtual object, the action performed by the physical object is delayed for a duration threshold. That is, before the physical object performs the action, the virtual object first provides a user with a pre-action. After the duration threshold, the third instruction is generated according to the effective action of the virtual object and sent as the target instruction to the physical object, to cause the physical object to perform the corresponding action. This prevents the physical object from performing ineffective actions, thereby reducing the power consumption of the physical object and improving control efficiency.

Here, the duration threshold may be 20 seconds, 10 seconds, etc.

For example, the timing starts when the mechanical arm of a virtual robot starts to move to the left under the control of the control stick. After 10 seconds, the historical actions of the mechanical arm of the virtual object are obtained. For example, after the mechanical arm of the virtual object moves 10 centimeters to the left and then moves 5 centimeters to the right, the effective action of the virtual robot's mechanical arm is a movement of 5 centimeters to the left. Accordingly, a third instruction is generated according to the effective action of the robot arm to move 5 centimeters to the left. The third instruction is determined to be the target instruction and sent to the physical robot, to cause the mechanical arm of the physical robot to move 5 centimeters to the left. This then prevents the mechanical arm from performing ineffective actions, thereby reducing the power consumption of the physical robot and improving control efficiency.

For another example, the timing starts when the wheel structure of a virtual robot starts to move forward. After 20 seconds of timing, the historical actions of the wheel structure are obtained. For example, after the wheel structure moves forward 10 meters and then moves backward 2 meters, the effective action of the wheel structure of the virtual robot is a forward movement of 8 meters. Accordingly, a third instruction is generated according to the effective action of the wheel structure to move forward 8 meters. The third instruction is determined to be the target instruction and sent to the physical robot, to allow the wheel structure of the physical robot to move forward 8 meters. This prevents ineffective actions of the wheel structure, thereby reducing the power consumption of the physical robot and improving control efficiency.

In one embodiment, the virtual object is output as being inside a target image, where the target image is an image corresponding to an environment where the physical object is located.

Figure 4:
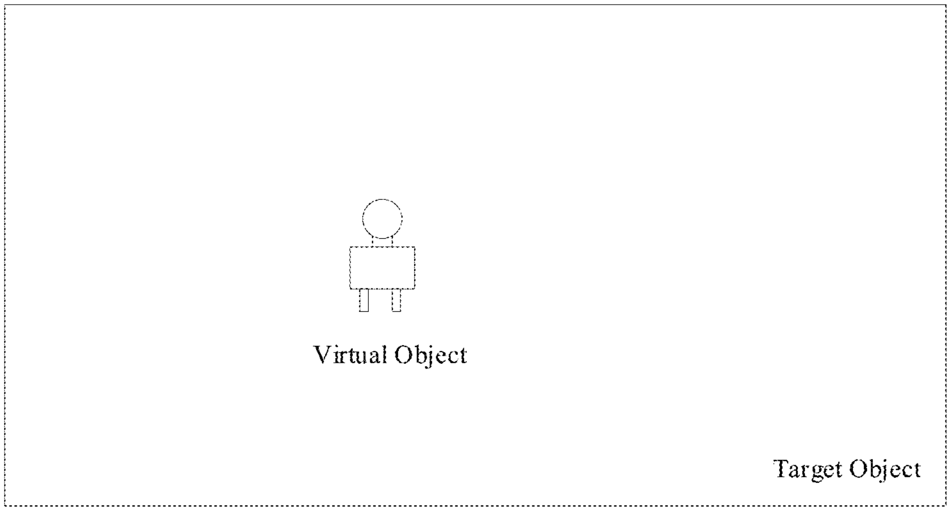
FIG. 4 is a schematic diagram of a target image, according to an embodiment of the present disclosure.

For example, as shown in FIG. 4, the virtual object is output in a target image, and the virtual object performs actions in the target image, which are provided to the user as a control reference of the physical object.

Figure 5:
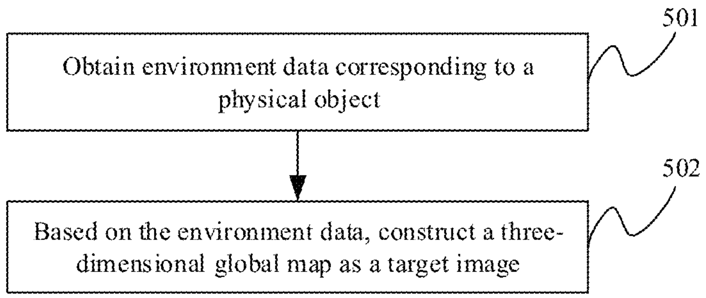
FIG. 5 is a flow chart of another part of a control method, according to an embodiment of the present disclosure.

In the disclosed embodiment, the target image may be obtained according to the following steps, as shown in FIG. 5:

Step 501: Obtain environment data corresponding to a physical object.

In the disclosed embodiment, environmental data corresponding to an environment in which a physical object is located may be collected through devices such as cameras and scanners. Environmental data includes images, videos, point cloud data, etc.

Step 502: Based on the environment data, construct a three-dimensional global map as a target image, where pose parameters of the virtual object in the target image match pose parameters of the physical object.

Here, the pose parameters include position parameters and gesture parameters, and the pose parameters may be represented by six-degree-of-freedom parameters.

In the disclosed embodiment, a three-dimensional scene construction algorithm may be configured to construct a three-dimensional global map based on the environmental data. A virtual object is then created in the three-dimensional global map, where the pose parameters of the virtual object match the pose parameters of the physical object.

Furthermore, in the disclosed embodiment, a first-perspective image corresponding to the physical object is superimposed on the target image, where the first-perspective image is an image collected by the physical object from its environment.

In the disclosed embodiment, the first-perspective image may be a real-life image collected by an image acquiring unit on the physical object along a corresponding collection direction such as a first perspective (i.e., a first viewing angle).

Figure 6:
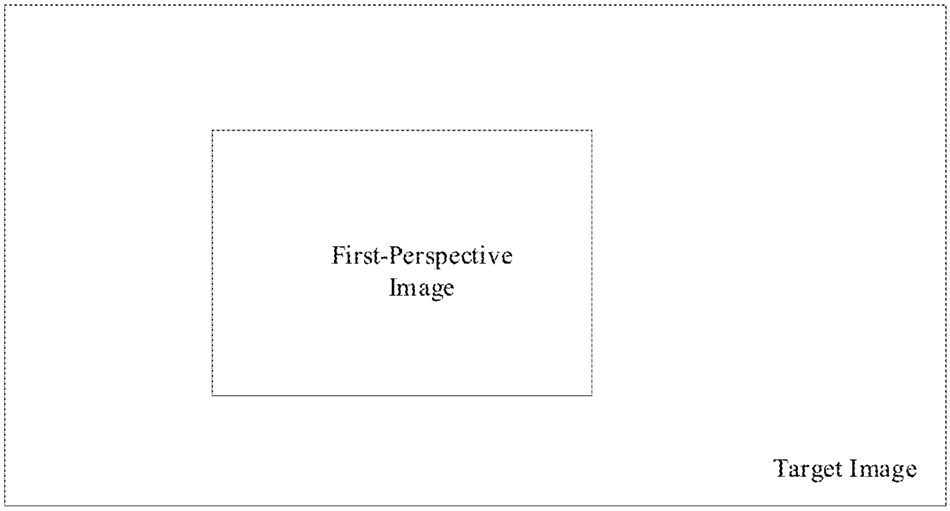
FIG. 6 is a schematic diagram of superimposing a first-perspective image on a target image, according to an embodiment of the present disclosure.

For example, as shown in FIG. 6, the target image includes a three-dimensional global map of the space where the physical robot is located, and the target image is superimposed with a real-life image collected from the first-perspective of the physical robot.

Figure 7:
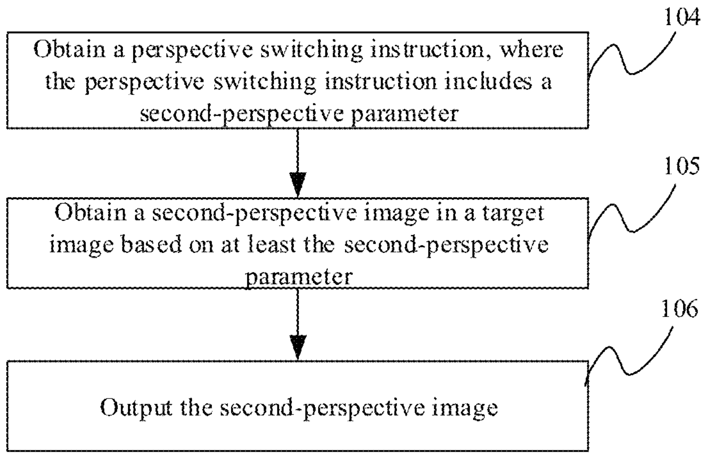
FIG. 7 is a flow chart of another part of a control method, according to an embodiment of the present disclosure.

Based on the above-described embodiments, the method in the disclosed embodiment may also include the following steps, as shown in FIG. 7:

Step 104: Obtain a perspective switching instruction, where the perspective switching instruction includes a second-perspective parameter.

Here, the perspective switching instruction may be generated based on a received perspective switching action.

Figure 8:
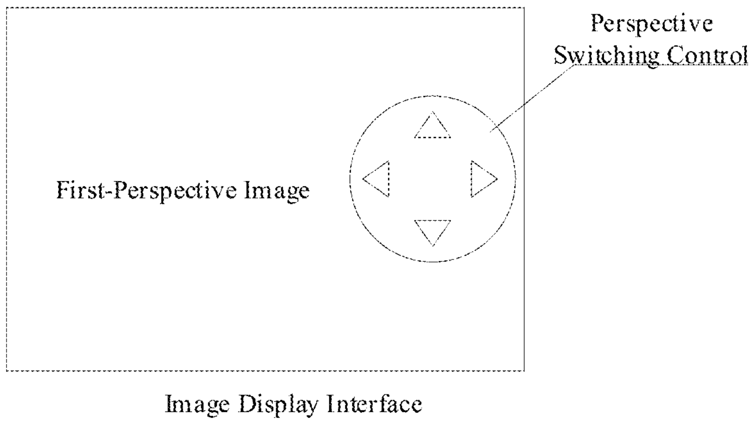
FIGS. 8-9 are schematic diagrams of respective image display interfaces, according to an embodiment of the present disclosure.

For example, as shown in FIG. 8, a first-perspective image in the target image is output on the image display interface, and a perspective switching control is also output on the image display interface. After a user clicks the perspective switching control to the right, a perspective switching instruction is generated. The perspective switching instruction includes a second-perspective parameter after the perspective is switched to the right.

Step 105: Obtain a second-perspective image in the target image based on at least the second-perspective parameter.

The second-perspective image includes at least part of the first-perspective image and at least part of the target image.

In the disclosed embodiment, a corresponding three-dimensional local map may be first intercepted from the target image according to the second-perspective parameter. An overlapping portion of the first-perspective image that overlaps with the three-dimensional local image in the perspective range may be then intercepted from the first-perspective image. Next, superimpose the overlapping portion of the first-perspective image onto the three-dimensional local image according to the perspective range to obtain the second-perspective image.

Figure 9:
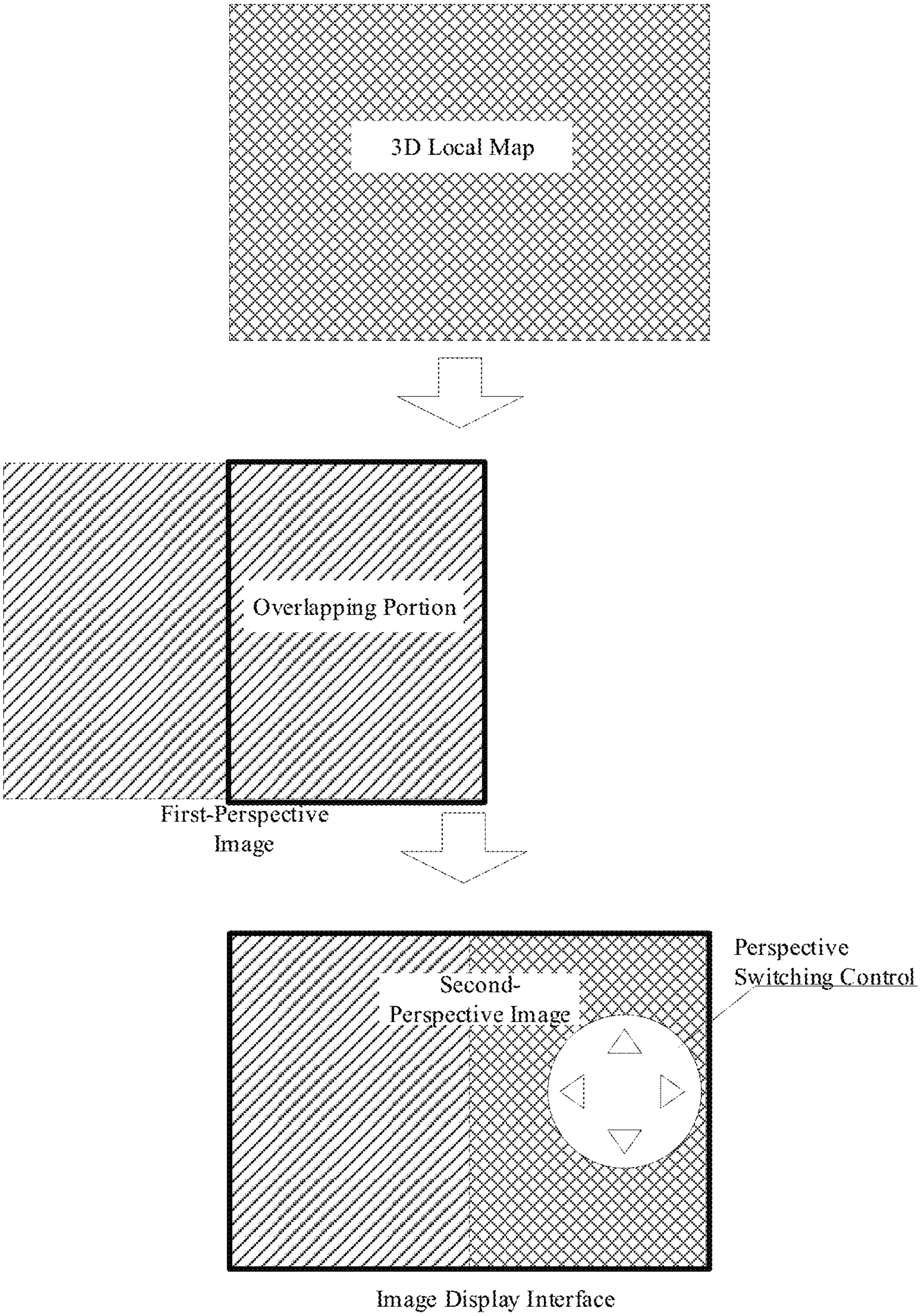

For example, as shown in FIG. 9, a three-dimensional (3D) local map corresponding to the second-perspective parameter is intercepted from the target image. An overlapping portion of the first-perspective image that overlaps with the three-dimensional local map corresponding to the second-perspective parameter is then intercepted from the first-perspective image. Next, the overlapping portion of the first-perspective image is superimposed on the three-dimensional local image to obtain the second-perspective image.

Step 106: Output the second-perspective image.

For example, in the disclosed embodiment, the second-perspective image is output on the image display interface.

Figure 10:
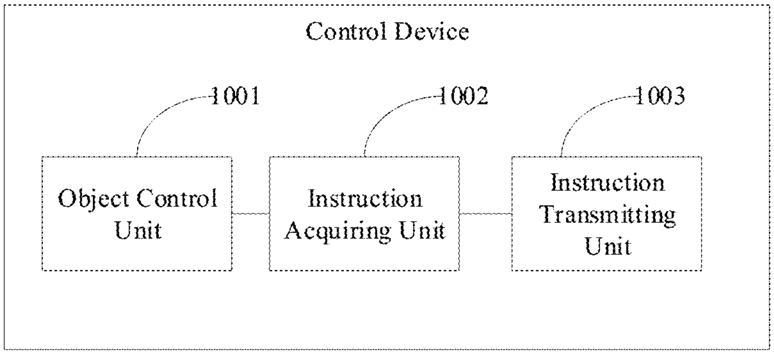
FIG. 10 is a schematic structural diagram of a control device, according to an embodiment of the present disclosure.

FIG. 10 illustrates a schematic structural diagram of a control device according to Embodiment 2 of the present disclosure. The control device may be configured on an electronic device capable of controlling actions of physical objects. The electronic device may be a device (e.g., a mobile phone, computer, server, etc.) that is independent of the physical objects and capable of data transmission with the physical objects. The technical solutions in the disclosed embodiment are mainly used to improve the accuracy of motion control of physical objects.

In the disclosed embodiment, the control device may include the following units:

Object control unit 1001, which is configured to control a virtual object to perform an action, where the virtual object is constructed based on a physical object.

Instruction acquiring unit 1002, which is configured to determine a target instruction based on the action performed by the virtual object.

Instruction transmitting unit 1003, which is configured to send the target instruction to the physical object, to cause the physical object to perform an action.

From the above technical solutions, it can be seen that in the control device according to Embodiment 2 of the present disclosure, a virtual object corresponding to the physical object is pre-constructed. Accordingly, the virtual object is first controlled to perform an action. A corresponding target instruction is then determined based on the action performed by the virtual object. The target instruction is sent to the physical object, to cause the physical object to perform an action. It can be seen that in the disclosed embodiment, the virtual object is constructed to pre-execute the action, and then the action of the physical object is controlled based on the pre-executed action of the virtual object, so that the action performed by the physical object is more accurate.

In one embodiment, the instruction acquiring unit 1002 is further configured to: determine the first instruction as the target instruction when the action performed by the virtual object satisfies a control standard. For example, the first instruction may be an instruction to which the virtual object responds.

In one embodiment, the instruction acquiring unit 1002 is further configured to: determine a second instruction based on the actual action performed by the virtual object as the target instruction when the actual action performed by the virtual object satisfies a control standard.

In one embodiment, the instruction acquiring unit 1002 is further configured to: obtain historical actions of the virtual object; remove redundancy in the historical actions to obtain a target action; and determine a third instruction based on the target action as the target instruction.

Further, after controlling the virtual object to perform the action and before obtaining the historical action of the virtual object, the instruction acquiring unit 1002 is further configured to start timing when the virtual object starts to perform the action until the timing reaches a duration threshold. During the period, the instruction acquiring unit 1002 is further configured to: obtain historical actions of the virtual object.

In one embodiment, the object control unit 1001 is further configured to control at least one virtual sub-object in the virtual object to perform a corresponding action, where the virtual sub-object corresponds to a physical component included in the physical object.

In one embodiment, the virtual object is output in a target image, where the target image is an image corresponding to an environment where the physical object is located.

Figure 11:
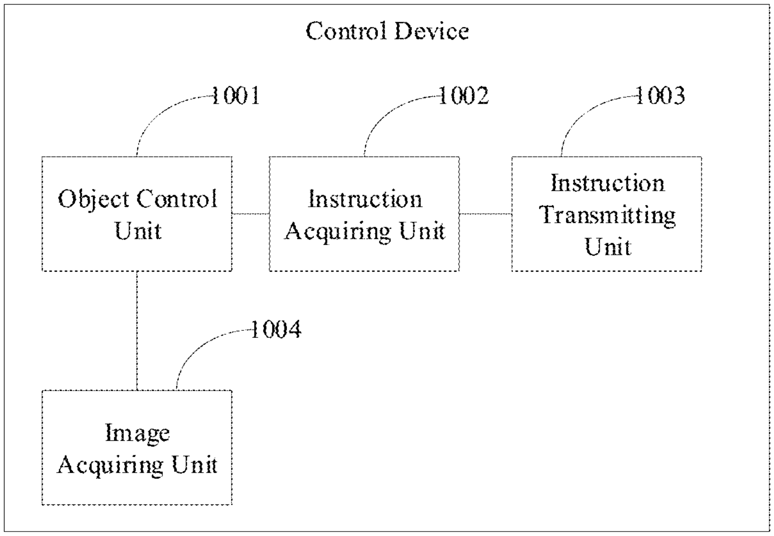
FIG. 11 is another structural schematic diagram of a control device, according to an embodiment of the present disclosure.

In the disclosed embodiment, the device may also include the following unit, as shown in FIG. 11:

Image acquiring unit 1004, which is configured to obtain environmental data corresponding to the physical object; construct a three-dimensional global map as a target image according to the environmental data, where pose parameters of the virtual object in the target image are consistent with pose parameters of the physical object. Here, the target image is superimposed with a first-perspective image corresponding to the physical object, and the first-perspective image is an image collected by the physical object from its environment.

In one embodiment, the image acquiring unit 1004 is further configured to: obtain a perspective switching instruction, where the perspective switching instruction includes a second-perspective parameter; and obtain a second-perspective image in the target image based on at least the second-perspective parameter, where the second-perspective image includes at least a part of the first-perspective image and at least a part of the target image; and output the second-perspective image.

It should be noted that, for the specific implementation of each unit in the disclosed embodiment, reference may be made to the corresponding content in the foregoing descriptions, details of which will not be repeated here.

Figure 12:
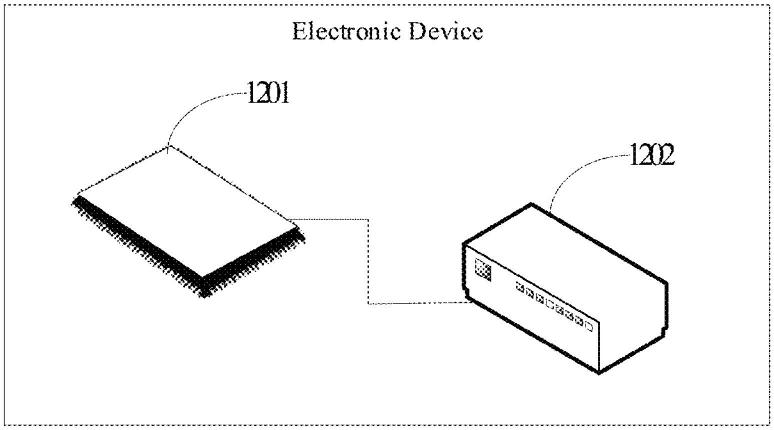
FIG. 12 is a schematic structural diagram of an electronic device, according to an embodiment of the present disclosure.

FIG. 12 illustrates a schematic structural diagram of an electronic device according to Embodiment 3 of the present disclosure. The electronic device may include the following structure:

Memory 1201, which is configured to store a computer program and data generated by the execution of the computer program.

Processor 1202, which is configured to execute the computer program to: control a virtual object to perform an action, where the virtual object is constructed based on a physical object; determine a target instruction based on the action of the virtual object; and send the target instruction to the physical object, to cause the physical object to perform an action.

From the above technical solutions, it can be seen that in the electronic device according to Embodiment 3 of the present disclosure, a virtual object corresponding to the physical object is pre-constructed. Accordingly, the virtual object is first controlled to perform an action. The corresponding target instruction is then determined based on the action of the virtual object. The target instruction is sent to the physical object, to cause the physical object to perform an action. It can be seen that in the disclosed embodiment, the virtual object is constructed to pre-execute the action, and then the action of the physical object is controlled based on the pre-executed action of the virtual object, so that the action performed by the physical object is more accurate.

Take a scenario of remote control of a robot as an example. In the current remote control of robots, if a user operates a robot from the first-perspective of the robot, the user will not be able to better control the entire surrounding environment. For example, the user cannot observe the changes in the environment under the robot's feet, making it difficult for the user to remotely control on complex terrain and unable to determine the control amplitude. If multiple cameras are installed on the robot to transmit real-time images, the user will need to pay attention to images from multiple angles at the same time during the control.

In view of the above defects, the present disclosure proposes the following implementation plan:

1. Collect environmental data required by the physical robot to build a three-dimensional virtual scene, which is the aforementioned three-dimensional global map.
2. When the physical robot enters a complex terrain section, the three-dimensional global map of the instant section is called up based on the map position of the physical robot.
3. Synchronously generate a virtual three-dimensional image of the current physical robot (i.e., the virtual robot) on the three-dimensional global map with the current real-time pose of the physical robot.
4. Superimpose the virtual image of the virtual robot onto the real-time image remotely viewed by the current user (at this moment, the user has no sense of the real-time image).
5. The user adjusts the perspective on the first-perspective real-time image (i.e., the aforementioned first-perspective image) transmitted by the physical robot. Based on that, the three-dimensional global map is then supplemented in real time with content beyond the first-perspective real-time image based on the real-time data and modeling information.
6. The user begins to control, for example: press and hold the arm movement button of the remote display terminal and slide forward. The virtual arm extends out of the robot arm to follow the movement. The arm posture is adjusted in real time according to the user's sliding, and is displayed in the current composite image. The movement of the real arm of the physical robot lags behind the virtual arm of the virtual robot by X seconds. After the user releases the control, the operation of the user in the following X seconds is not synchronized with the physical robot. For another example, a user presses the forward button section to control the robot to move forward. A virtual robot appears in the current composite image. After the virtual robot moves forward X seconds, the physical robot starts to move. If the user releases the forward button control, the operation of the user in the following X seconds will not be synchronized to the physical robot.

7. The virtual robot prioritizes the operation for X seconds, which provides intelligent suggestions in advance on the user interface (i.e., the aforementioned image display interface). For example, if moving the arm in one way, the arm may be blocked by a device, and thus it is recommended to move 10° to the right, etc.

Here, the value of X may be defined by the user.

The technical solutions disclosed herein have the following advantages:

1. Display a robot's perspective required by a user in an image that combines virtual with reality.
2. The virtual robot executes in advance for X seconds, which intuitively displays the operation result for the incoming X seconds for the physical robot. The intelligent suggestions displayed by the UI may be continuously optimized and fine tuned based on the robot's previous operations in similar scenes. In addition, it may solve the problem of poor experience caused by the robot remote control delay without the user being aware of it.

Figure 13:
FIGS. 13-16 are schematic diagrams of scenarios applicable to remote control of robots, according to an embodiment of the present disclosure.
Figure 14:

Specific details are further provided:

1. The original first-perspective image is a real-life image, as shown in FIG. 13.
2. Switch to any third-perspective (here is a three-dimensional virtual map combined with a three-dimensional virtual robot with coordinate synchronization), as shown in FIG. 14.

Here, on the current virtual image, the user adjusts the appropriate angle of the third-perspective through touch screen operation gestures/remote control, etc. After the adjustment is completed, the robot operation begins (e.g., control the mechanical arm to move forward, backward, up and down, etc.).

Figure 15:
Figure 16:

3. The user's control of the robot will be pre-feedbacked to the user in the current virtual three-dimensional scene, as shown in FIG. 15.
4. After switching to the first-perspective, the virtual robot's pre-operation trajectory and feedback will also be superimposed on the first-perspective in AR form, as shown in FIG. 16.
5. After everything is confirmed ok, the physical robot performs the action following the remote control.

Each embodiment in this specification is described in a progressive manner. Each embodiment focuses on its difference from other embodiments. The same and similar parts between the various embodiments may be referred to each other. As for a device disclosed in an embodiment, since it corresponds to a method disclosed in the method embodiments, the description is relatively simple. For relevant details, please refer to the description in the method section.

Those skilled in the art may further realize that the units and algorithm steps of each example described in connection with the embodiments disclosed herein may be implemented by electronic hardware, computer software, or a combination thereof. In order to clearly illustrate the interchangeability between the hardware and software, in the above descriptions, the composition and steps of each embodiment have been generally described according to functions. Whether these functions are performed in hardware or software depends on the specific application and design constraints of the technical solution. A person skilled in the art may implement the described functionality using different methods for each specific application, but such implementations should not be considered beyond the scope of the present disclosure.

The steps of the methods or algorithms described in conjunction with the embodiments disclosed herein may be implemented directly in hardware, in software modules executed by a processor, or in a combination thereof. Software modules may be located in random access memory (RAM), read-only memory (ROM), electrically programmable ROM, electrically erasable programmable ROM, registers, hard disks, removable disks, CD-ROMs, or any other known form of storage media in the technology of the relevant field.

The above description of the disclosed embodiments enables those skilled in the art to implement or use the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments shown herein but is to be accorded the widest scope consistent with the principles and novel features disclosed herein.

What is claimed is:

1. A control method, comprising:

controlling a virtual object to perform an action, the virtual object being constructed based on a physical object;

determining a target instruction based on the action performed by the virtual object, the determining the target instruction comprising:

starting, when the virtual object begins to perform the action, a timing until a duration threshold is reached;

obtaining, as historical actions of the virtual object, actions of the virtual object performed during the timing; and removing redundancy in the historical actions to obtain a target action; and determining the target instruction based on the target action; and sending the target instruction to the physical object to cause the physical object to perform an action.

2. The method according to claim 1, wherein determining the target instruction based on the action performed by the virtual object comprises:

when the action performed by the virtual object satisfies a control standard, determining a first instruction as the target instruction, the first instruction being an instruction to which the virtual object responds.

3. The method according to claim 1, wherein determining the target instruction based on the action performed by the virtual object comprises:

when the action performed by the virtual object satisfies a control standard, determining a second instruction to be the target instruction according to the action performed by the virtual object.

4. The method of claim 1, wherein controlling the virtual object to perform the action comprises:

controlling at least one virtual sub-object in the virtual object to perform a corresponding action, wherein the virtual sub-object corresponds to a physical component included in the physical object.

5. The method according to claim 1, wherein the virtual object is output in a target image, wherein the target image is an image corresponding to an environment in which the physical object is located.

6. The method according to claim 5, wherein the target image is obtained by:

obtaining environment data corresponding to the physical object; and according to the environmental data, constructing a three-dimensional global map as a target image, wherein:

pose parameters of the virtual object in the target image match pose parameters of the physical object;

the target image is superimposed with a first-perspective image corresponding to the physical object; and the first-perspective image is an image collected by the physical object the environment in which the physical object is located.

7. The method of claim 6, further comprising:

obtaining a perspective switching instruction, wherein the perspective switching instruction includes a second perspective parameter;

obtaining a second perspective image in the target image according to at least the second perspective parameter, the second perspective image including at least part of the first-perspective image and at least part of the target image; and outputting the second perspective image.

8. The method according to claim 1, wherein the removing the redundancy in the historical actions comprises removing overlapping portions in an action path of the virtual object to obtain an effective action, the effective action being determined to be the target action.

9. The method according to claim 1, wherein an action of the physical object corresponding to the target instruction is delayed relative to the action of the virtual object by the duration threshold such that, before the physical object performs the corresponding action, the virtual object provides a pre-action comprising the historical actions.

10. The method according to claim 1, wherein the determining the target instruction further comprises receiving, via an operation interface, a confirmation operation from a user for the action performed by the virtual object and determining the target instruction only when the confirmation operation has been received.

11. An electronic device, comprising:

a memory, configured to store a computer program and data generated by execution of the computer program; and one or more processors, configured, when the computer program being executed, to:

control a virtual object to perform an action, where the virtual object is constructed based on a physical object;

determine a target instruction based on the action of the virtual object, the determining the target instruction comprising:

starting, when the virtual object begins to perform the action, a timing until a duration threshold is reached;

obtaining, as historical actions of the virtual object, actions of the virtual object performed during the timing; and removing redundancy in the historical actions to obtain a target action; and determining the target instruction based on the target action; and send the target instruction to the physical object, to cause the physical object to perform an action.

12. The device of claim 11, wherein the one or more processors are further configured to:

control at least one virtual sub-object in the virtual object to perform a corresponding action, wherein the virtual sub-object corresponds to a physical component included in the physical object.

13. The device of claim 11, wherein the one or more processors are further configured to:

determine a first instruction as the target instruction, the first instruction being an instruction to which the virtual object responds, when the action performed by the virtual object satisfies a control standard.

14. The device of claim 11, wherein the one or more processors are further configured to:

determine a second instruction based on the action performed by the virtual object as the target instruction when the action performed by the virtual object satisfies a control standard.

15. The device of claim 11, wherein the virtual object is output in a target image, wherein the target image is an image corresponding to an environment where the physical object is located.

16. The device of claim 15, wherein the one or more processors are further configured to:

obtain environmental data corresponding to the physical object;

according to the environmental data, construct a three-dimensional global map as the target image, wherein:

pose parameters of the virtual object in the target image match pose parameters of the physical object;

the target image is superimposed with a first-perspective image corresponding to the physical object; and the first-perspective image is an image collected by the physical object in the environment in which the physical object is located.

17. The device of claim 16, wherein the one or more processors are further configured to:

obtain a perspective switching instruction, wherein the perspective switching instruction includes a second-perspective parameter;

obtain a second-perspective image in the target image based on at least the second-perspective parameter, wherein the second-perspective image includes at least a part of the first-perspective image and at least a part of the target image; and output the second-perspective image.

18. A non-transitory computer readable storage medium containing a computer program, that when being executed, causes one or more processors to perform a control method, the method comprising:

controlling a virtual object to perform an action, the virtual object being constructed based on a physical object;

determining a target instruction based on the action performed by the virtual object, the determining the target instruction comprising:

starting, when the virtual object begins to perform the action, a timing until a duration threshold is reached;

obtaining, as historical actions of the virtual object, actions of the virtual object performed during the timing; and removing redundancy in the historical actions to obtain a target action; and determining the target instruction based on the target action; and sending the target instruction to the physical object to cause the physical object to perform an action.

19. The storage medium of claim 18, wherein the one or more processors are further configured to:

control at least one virtual sub-object in the virtual object to perform a corresponding action, wherein the virtual sub-object corresponds to a physical component included in the physical object.

* * * * *